United States Patent [19]

Kojima et al.

[11] Patent Number: 5,758,318
[45] Date of Patent: May 26, 1998

[54] SPEECH RECOGNITION APPARATUS HAVING MEANS FOR DELAYING OUTPUT OF RECOGNITION RESULT

[75] Inventors: Hideki Kojima; Shinta Kimura, both of Kawasaki, Japan

[73] Assignee: Fujitsu Limited, Kawasaki, Japan

[21] Appl. No.: 266,381

[22] Filed: Jun. 27, 1994

[30] Foreign Application Priority Data

Sep. 20, 1993 [JP] Japan .................... 5-233863

[51] Int. Cl.[6] ........................................ G10L 3/00
[52] U.S. Cl. .................. 704/251; 704/246; 704/275
[58] Field of Search ........................ 395/2.84, 2.79, 395/154, 152, 2.6, 2.52, 2.66; 381/43; 179/1; 704/246, 231

[56] References Cited

U.S. PATENT DOCUMENTS

| | | |
|---|---|---|
| 4,093,831 | 6/1978 | Sharp et al. ................... 369/50 |
| 4,158,750 | 6/1979 | Sakoe et al. ................... 179/1 |
| 4,401,852 | 8/1983 | Noso et al. ................... 179/1 |
| 4,468,204 | 8/1984 | Scott et al. ................... 434/309 |
| 4,506,378 | 3/1985 | Noso et al. ................... 381/43 |
| 4,528,687 | 7/1985 | Noso et al. ................... 381/43 |
| 5,040,790 | 8/1991 | Anthes et al. ................... 273/446 |
| 5,157,384 | 10/1992 | Greanias et al. ................... 345/156 |
| 5,165,095 | 11/1992 | Borcherding ................... 379/88 |
| 5,199,062 | 3/1993 | Von Meister et al. ................... 379/67 |
| 5,263,167 | 11/1993 | Connor, Jr. et al. ................... 395/604 |
| 5,293,584 | 3/1994 | Brown et al. ................... 395/2.86 |
| 5,425,128 | 6/1995 | Morrison ................... 395/2.52 |
| 5,500,920 | 3/1996 | Kupiec ................... 395/2.79 |

*Primary Examiner*—David R. Hudspeth
*Assistant Examiner*—Donald L. Storm
*Attorney, Agent, or Firm*—Nikaido, Marmelstein, Murray & Oram LLP

[57] ABSTRACT

A speech recognition apparatus generates an output which is displayed on a display. The speech recognition apparatus includes a recognition device for recognizing an input speech and for outputting a recognition result or a response corresponding thereto. A delay device is provided, coupled to the recognition device, for delaying the recognition result or the response output from the recognition device by a predetermined time. The delay device also supplies the delay recognition result or response to the display as an output of the speech recognition apparatus.

14 Claims, 14 Drawing Sheets

5,758,318

1

SPEECH RECOGNITION APPARATUS HAVING MEANS FOR DELAYING OUTPUT OF RECOGNITION RESULT

BACKGROUND OF THE INVENTION

The present invention generally relates to speech recognition apparatuses, and more particularly to a speech recognition apparatus which recognizes an input speech and makes a corresponding output responsive thereto.

Conventionally, there are speech recognition apparatuses which provide a human interface by recognizing an input speech and outputs a recognition result or a response by speeches, characters (messages) and the like.

According to the conventional speech recognition apparatus, a time required to output the recognition result or the response from a time when the input speech is received is determined by the speech recognition speed. Hence, the recognition result or the response is output quickly if the speech recognition speed is high. For this reason, the output of the recognition result or the response may be made quickly even with respect to the input speech which includes complicated contents, and in such a case, the user who made the input by speech may become confused. In other words, if the recognition result or the response is output too quickly even with respect to the input speech which includes the complicated contents, there was a problem in that the user becomes confused and uncomfortable with the human interface provided by the speech recognition apparatus.

SUMMARY OF THE INVENTION

Accordingly, it is a general object of the present invention to provide a novel and useful speech recognition apparatus in which the problem described above is eliminated.

Another and more specific object of the present invention is to provide a speech recognition apparatus comprising recognition means for recognizing an input speech and for outputting a recognition result or a response corresponding to the recognition result, and delay means, coupled to the recognition means, for delaying output of the recognition result or the response by a predetermined time. According to the speech recognition apparatus of the present invention, it is possible to prevent the user from becoming confused or uncomfortable by the output which is made too quickly in a case where the speech recognition speed is too fast. In addition, the speech recognition apparatus can be improved as a human interface because the delay time may be set arbitrarily to suit the particular needs. For example, the delay time may be variably set depending on the time, the number of times the apparatus is used, the length of the speech interval, the speech power, the setting made by the user and the like.

Other objects and further features of the present invention will be apparent from the following detailed description when read in conjunction with the accompanying drawings.

DESCRIPTION OF THE PREFERRED EMBODIMENTS

Figure 1:
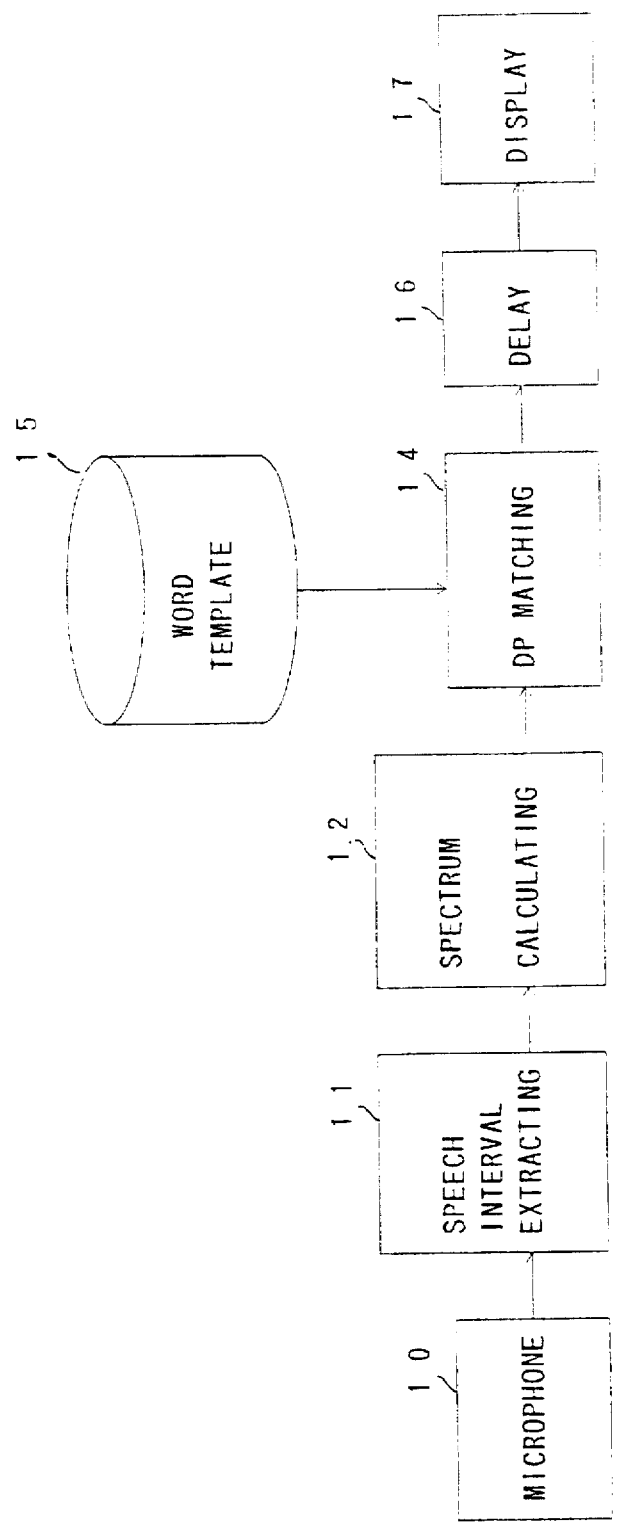
FIG. 1 is a system block diagram showing a first embodiment of a speech recognition apparatus according to the present invention.

FIG. 1 shows a first embodiment of a speech recognition apparatus according to the present invention. In FIG. 1, a microphone 10 converts an input speech into an audio signal, and supplies this audio signal to a speech interval extracting part 11. The speech interval extracting part 11 extracts a speech interval in which the audio signal continues at a level greater than a predetermined level, and supplies the audio signal of the extracted speech interval to a spectrum calculating part 12 after carrying out a preparation process such as pre-emphasis and noise elimination.

The spectrum calculating part 12 divides the audio signal into approximately 20 frequency bands, and obtains a power spectrum of the speech by reading as characteristic parameters the root-mean-square values of the outputs in each of the frequency bands for every frame period of 10 to 20 msec. The obtained power spectrum of the speech is supplied to a dynamic programming (DP) matching part 14. The DP matching part 14 carries out a non-linear matching using the dynamic programming (DP) between the characteristic parameters in the speech interval obtained in the spectrum calculating part 12 and standard parameters prestored in a word template 15. The DP matching part 14 outputs as the recognition result the word which is eliminated of the time base distortion and has the standard pattern such that a distance obtained by a similarity calculation becomes a minimum.

This recognition result is delayed by a delay time in a delay part 16, and is supplied to a display part 17 which displays the recognition result of the input speech in characters. For example, the predetermined delay time of the delay part 16 is set to a time such that the time required to display the recognition result of the input speech on the display part 17 does not exceed 2 seconds.

Because this embodiment is provided with the delay part 16, it is possible to suitably delay the output of the recognition result or the response even if the speech recognition speed is too fast. As a result, it is possible to prevent the user from becoming confused and uncomfortable by the output of the recognition result or the response that is too quick, and the speech recognition apparatus becomes more user-friendly.

Figure 2:
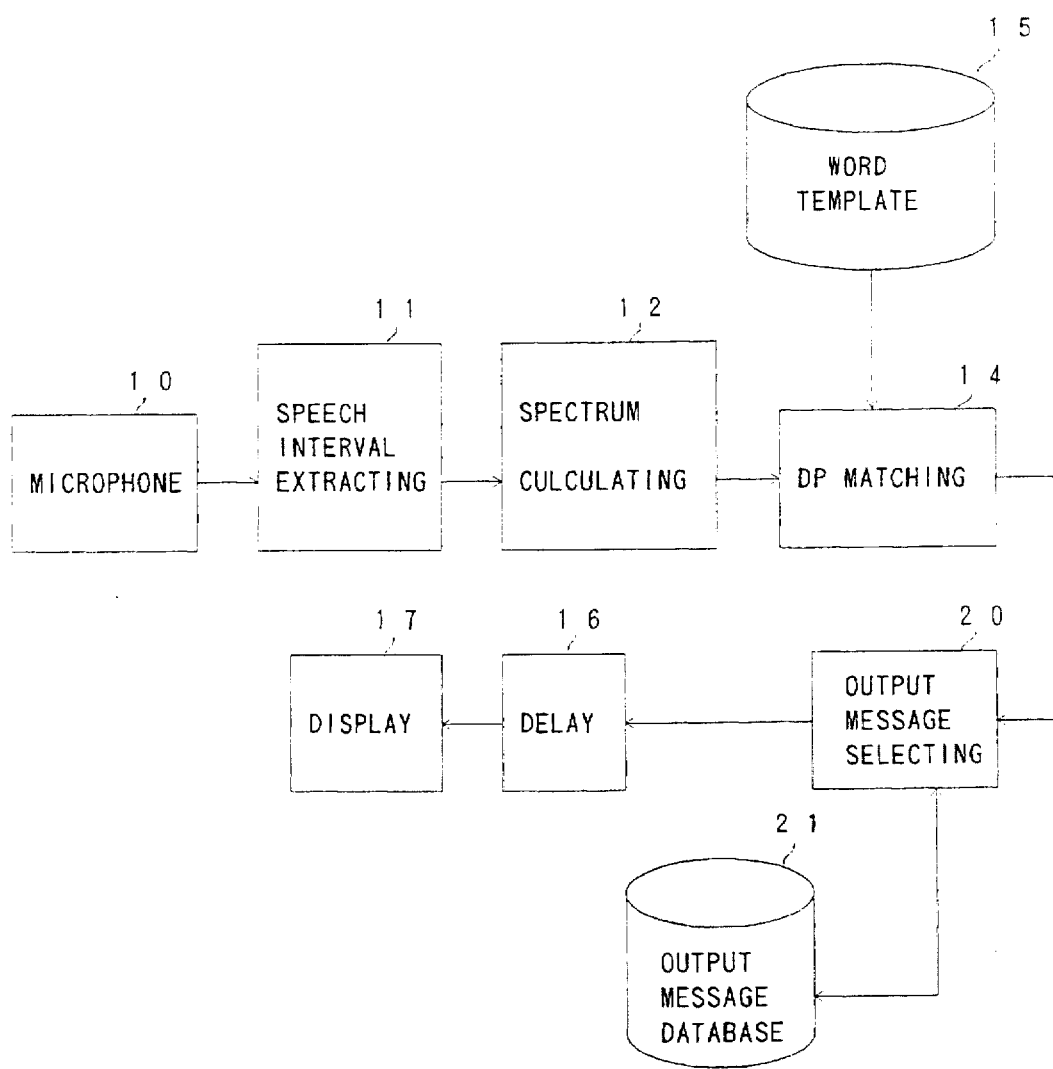
FIG. 2 is a system block diagram showing a first modification of the first embodiment.
Figure 3:
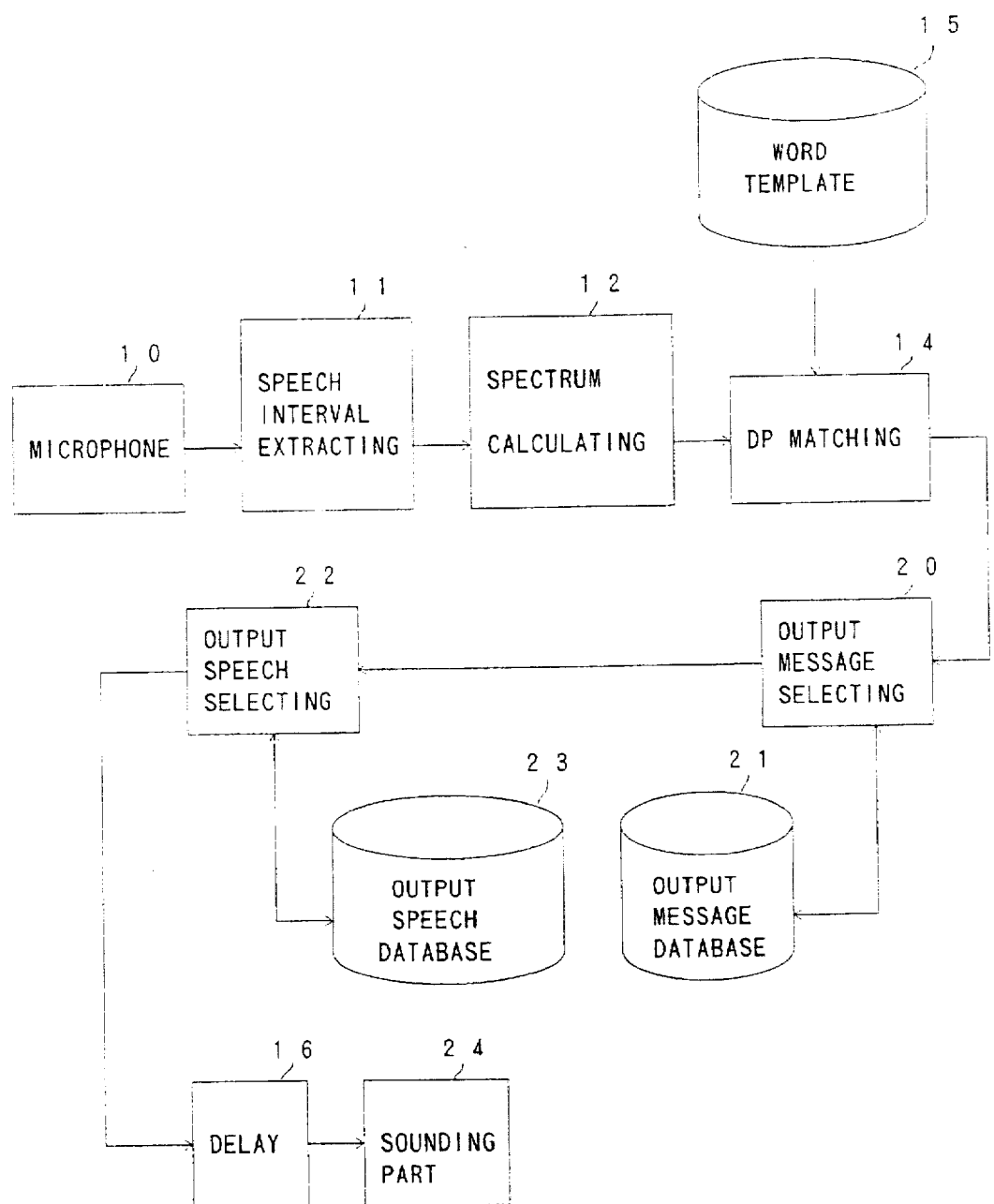
FIG. 3 is a system block diagram showing a second modification of the first embodiment.

FIGS. 2 and 3 respectively show first and second modifications of the first embodiment described above. In FIGS.

2 and 3, those parts which are the same as those corresponding parts in FIG. 1 are designated by the same reference numerals, and a description thereof will be omitted.

In the first modification of the first embodiment shown in FIG. 2, the recognition result output from the DP matching part 14 is supplied to an output message selecting part 20. The output message selecting part 20 retrieves an output message database 21 using the recognition result, and reads an output message corresponding to the recognition result of the input speech. For example, if the input speech is "The weather in Tokyo", an output message such as "For Tokyo, the weather is clear tomorrow" is retrieved from the output message database 21. The selected output message is delayed by the delay time in the delay part 16 and then supplied to the display part 17 which displays the selected output message.

On the other hand, in the second modification of the first embodiment shown in FIG. 3, the output message selected by the output message selecting part 20 is supplied to an output speech selecting part 22. The output speech selecting part 22 retrieves an output speech database 23 using the selected output message, and reads speech data for sounding the selected output message. The speech data are delayed by the predetermined delay time in the delay part 16 and is supplied to a sounding part 24. The sounding part 24 converts the speech data into an audio signal and supplies this audio signal to an internal speaker (not shown) so as to output the speech corresponding to the selected output message via the internal speaker.

Figure 4:
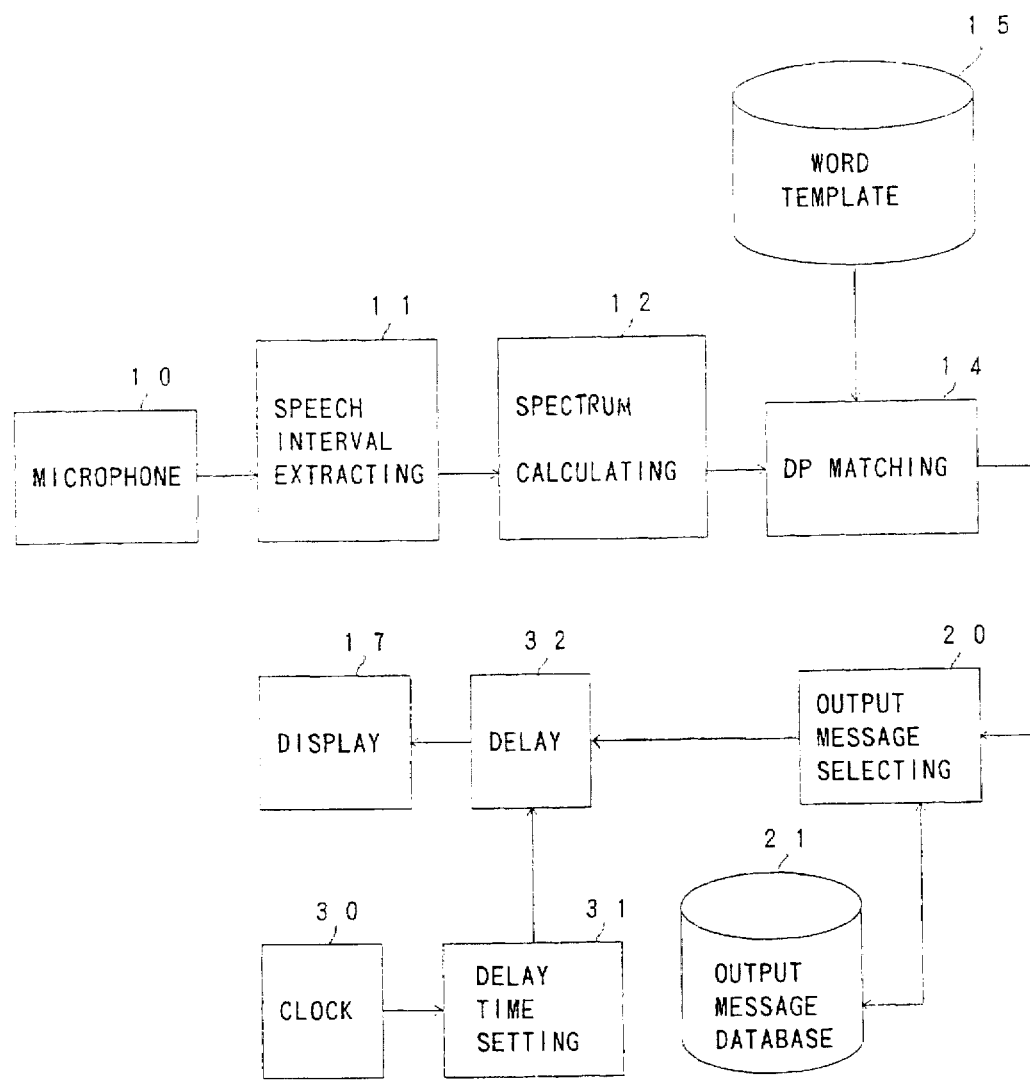
FIG. 4 is a system block diagram showing a second embodiment of the speech recognition apparatus according to the present invention.

FIG. 4 shows a second embodiment of the speech recognition apparatus according to the present invention. In FIG. 4, those parts which are the same as those corresponding parts in FIG. 2 are designated by the same reference numerals, and a description thereof will be omitted.

In FIG. 4, a clock 30 measures the present time and supplies the present time to a delay time setting part 31. The delay time setting part 31 variably sets a delay time of a variable delay part 32, so that the delay time decreases with time in the morning and the delay time is constant in the afternoon. The delay time of the variable delay part 31 is also set to a time which does not exceed 2 seconds, for example.

According to this embodiment, the time required to output the response to the input speech is varied to become shorter with time in the morning, so as to match the human response speed which generally becomes quicker with time in the morning. As a result, it is possible to prevent the user from becoming confused and uncomfortable with the human interface provided by the speech recognition apparatus.

Figure 5:
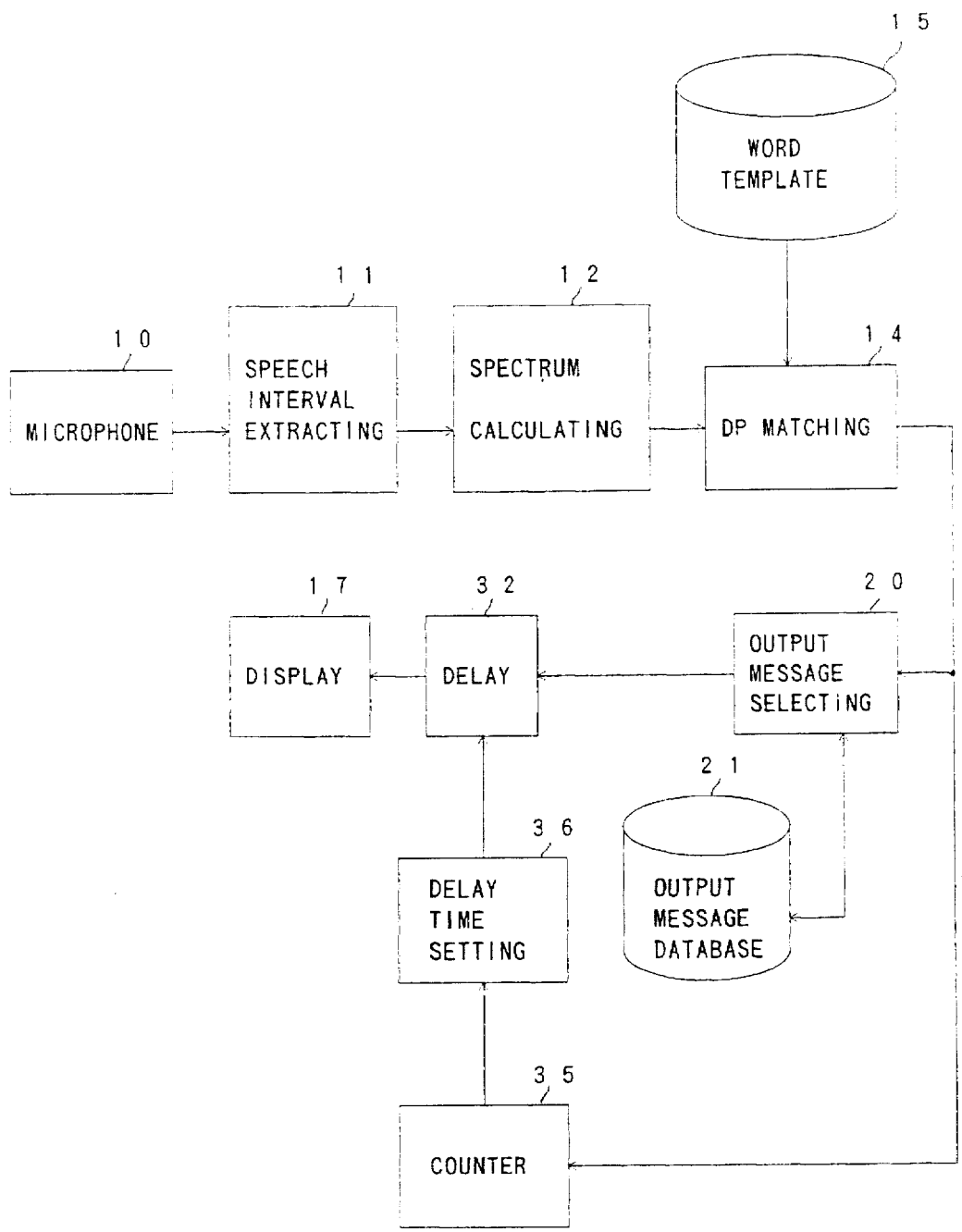
FIG. 5 is a system block diagram showing a third embodiment of the speech recognition apparatus according to the present invention.

FIG. 5 shows a third embodiment of the speech recognition apparatus according to the present invention. In FIG. 5, those parts which are the same as those corresponding parts in FIG. 4 are designated by the same reference numerals, and a description thereof will be omitted.

In FIG. 5, the recognition result output from the DP matching part 14 is supplied to a storage part 35 for storing a number of times the apparatus is used. A counter part 35 counts up the number of times the apparatus is used by 1 every time the recognition result is supplied thereto after a power supply (not shown) is turned ON. A delay time setting part 36 sets the delay time of the variable delay part 32 depending on the counted value of the counter part 35 so that the delay time decreases as the counted value increases and becomes constant when the counted value exceeds a predetermined value.

According to this embodiment, the response of the speech recognition apparatus becomes quicker as the number of times the apparatus is used increases and the user becomes more familiar with the apparatus. As a result, it is possible to prevent the user from becoming confused and uncomfortable with the human interface provided by the speech recognition apparatus.

Figure 6:
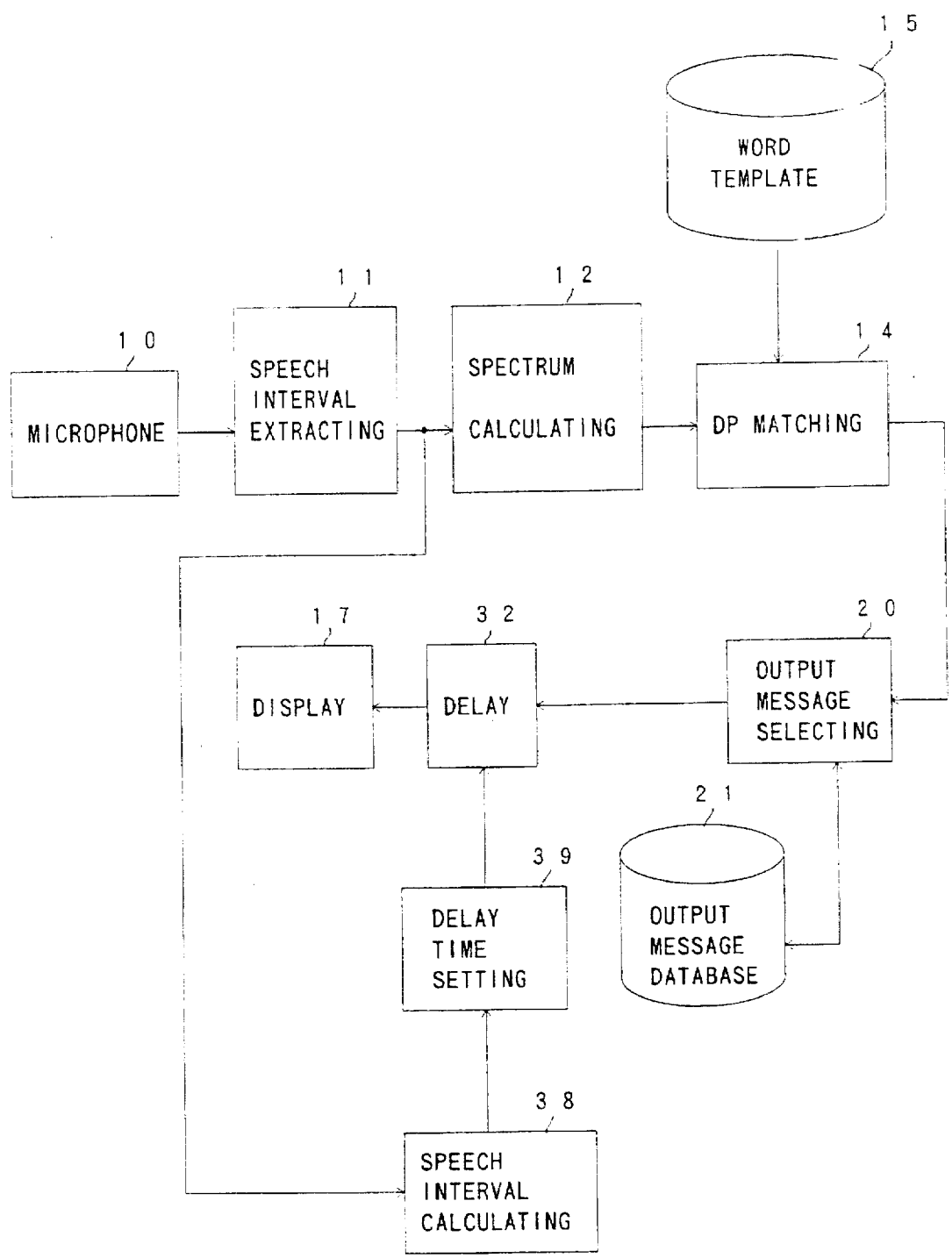
FIG. 6 is a system block diagram showing a fourth embodiment of the speech recognition apparatus according to the present invention.

FIG. 6 shows a fourth embodiment of the speech recognition apparatus according to the present invention. In FIG. 6, those parts which are the same as those corresponding parts in FIG. 4 are designated by the same reference numerals, and a description thereof will be omitted.

In FIG. 6, the speech interval extracted by the speech interval extracting part 11 is supplied to a speech interval calculating part 38. The speech interval calculating part 38 calculates the length of the speech interval, that is, the duration (time) of the speech interval. A delay time setting part 39 variably sets the delay time of the variable delay part 32 so that the delay time becomes longer as the speech interval becomes longer.

Normally, it takes more time to understand the contents of the speech as the speech interval becomes longer. According to this embodiment, the time it takes for the response to be received with respect to the input speech becomes longer depending on the time it takes to understand the contents. As a result, it is possible to prevent the user from becoming confused and uncomfortable with the human interface provided by the speech recognition apparatus.

Figure 7:
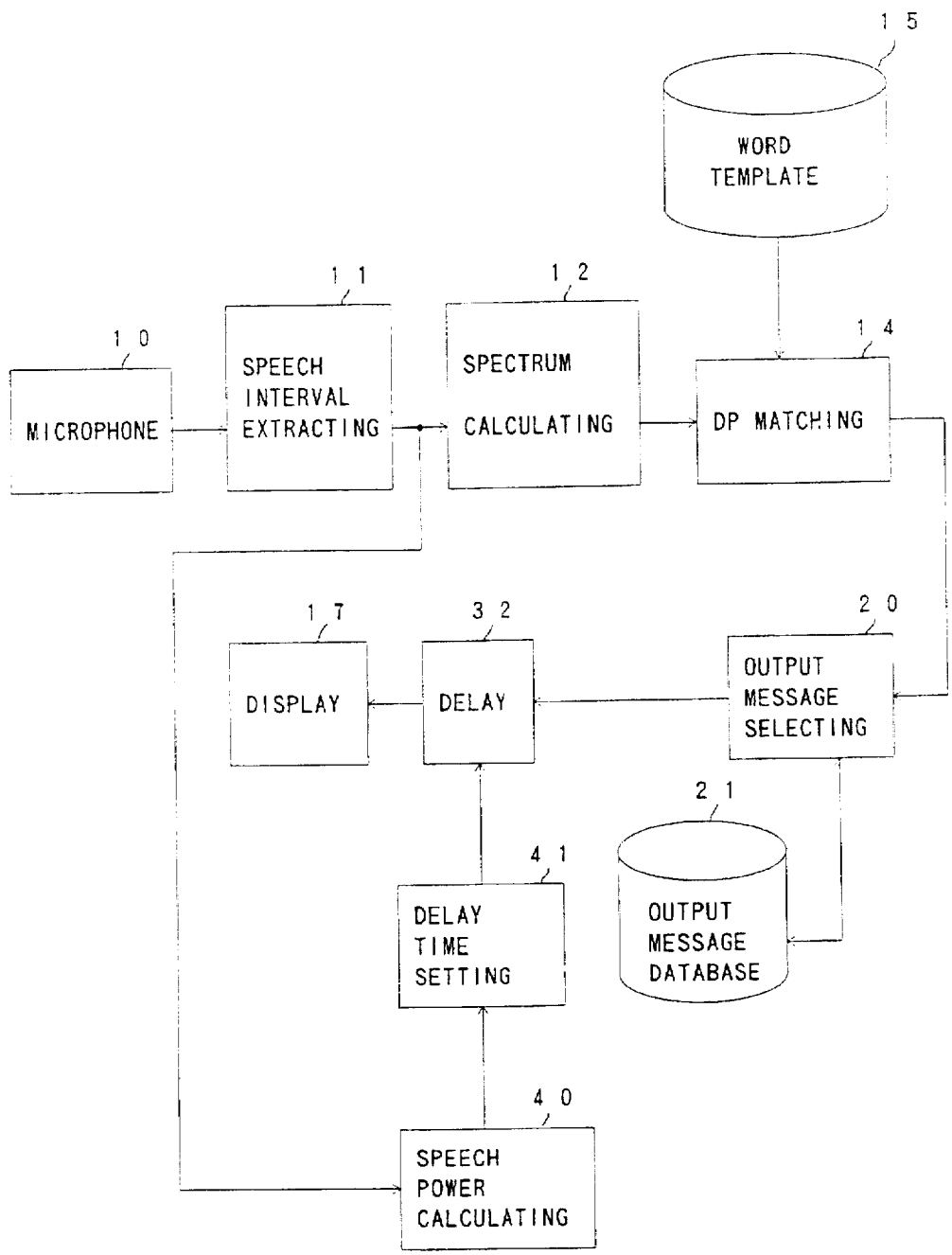
FIG. 7 is a system block diagram showing a fifth embodiment of the speech recognition apparatus according to the present invention.

FIG. 7 shows a fifth embodiment of the speech extraction apparatus according to the present invention. In FIG. 7, those parts which are the same as those corresponding parts in FIG. 6 are designated by the same reference numerals, and a description thereof will be omitted.

In FIG. 7, the speech interval extracted by the speech interval extracting part 11 is supplied to a speech power calculating part 40. The speech power calculating part 40 calculates an average speech power of the extracted speech interval. A delay time setting part 41 variably sets the delay time of the variable delay part 32 so that the delay time becomes shorter as the average speech power becomes larger.

Normally, it takes shorter time to understand the contents of the speech as the magnitude of the speech, that is, the speech power, becomes larger. According to this embodiment, the time it takes for the response to be received with respect to the input speech becomes shorter depending on the time it takes to understand the contents. As a result, it is possible to prevent the user from becoming confused and uncomfortable with the human interface provided by the speech recognition apparatus.

Figure 8:
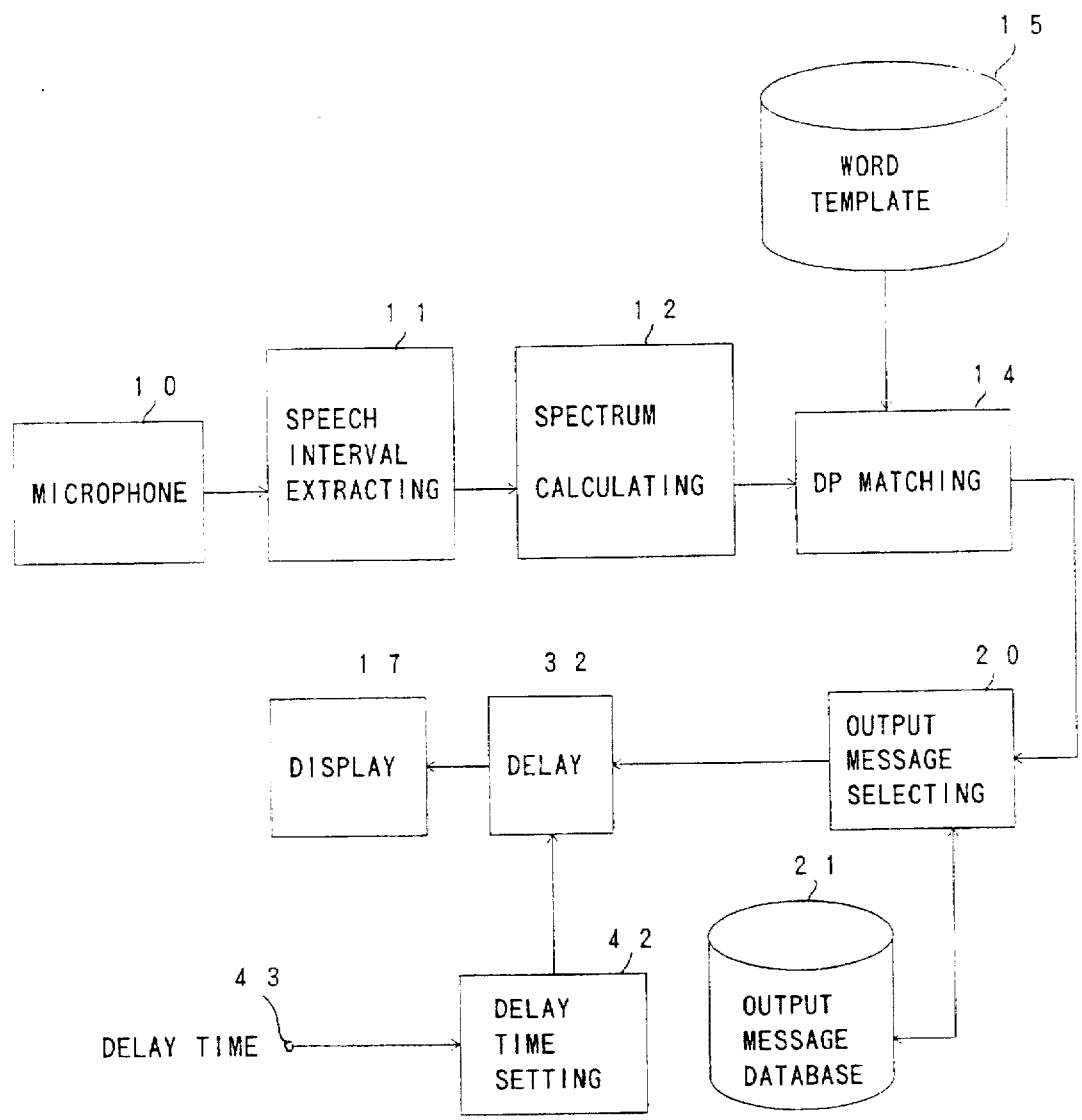
FIG. 8 is a system block diagram showing a sixth embodiment of the speech recognition apparatus according to the present invention.

FIG. 8 shows a sixth embodiment of the speech recognition apparatus according to the present invention. In FIG. 8, those parts which are the same as those corresponding parts in FIG. 4 are designated by the same reference numerals, and a description thereof will be omitted.

In FIG. 8, a delay time setting part 42 stores a delay time which is set by the user and is input via a terminal 43. This delay time setting part 42 sets the stored delay time in the delay part 32.

According to this embodiment, it is possible to set a desired delay time for each user. Hence, it is possible to variable set the time it takes to output the response from the time when the input speech is received depending on the user, that is, to suit the user's needs. As a result, it is possible to prevent the user from becoming confused and uncomfortable with the human interface provided by the speech recognition apparatus.

Figure 9:
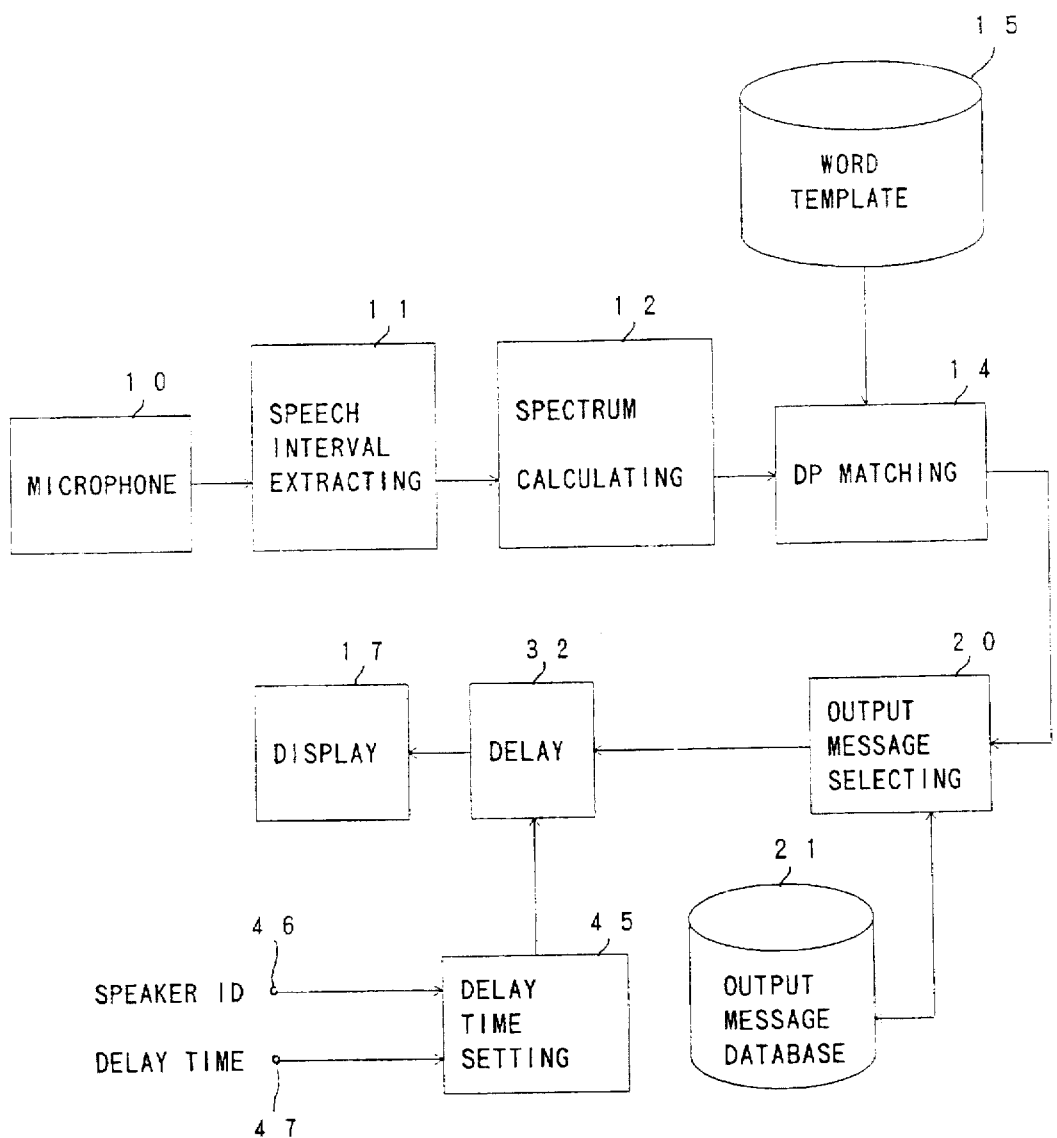
FIG. 9 is a system block diagram showing a modification of the sixth embodiment.

FIG. 9 shows a modification of the sixth embodiment. In FIG. 9, those parts which are the same as those corresponding parts in FIG. 4 are designated by the same reference numerals, and a description thereof will be omitted.

In FIG. 9, a delay time setting part 45 stores a speaker identification (ID) which is input via a terminal 46, and a delay time which is input via a terminal 47. The speaker ID relates to an identification (ID) number of the user, and the delay time input via the terminal 47 is set by the user. The delay time setting part 45 stores the delay time input via the terminal 47 in correspondence with the speaker ID input from the terminal 46. The delay time setting part 45 sets in the delay part 32 the corresponding delay time every time the speaker ID is input.

According to this modification of the sixth embodiment, it is possible to set a desired delay time for each user. Hence, it is possible to variable set the time it takes to output the response from the time when the input speech is received depending on the user, that is, to suit the user's needs. As a result, it is possible to prevent the user from becoming confused and uncomfortable with the human interface provided by the speech recognition apparatus.

Figure 10:
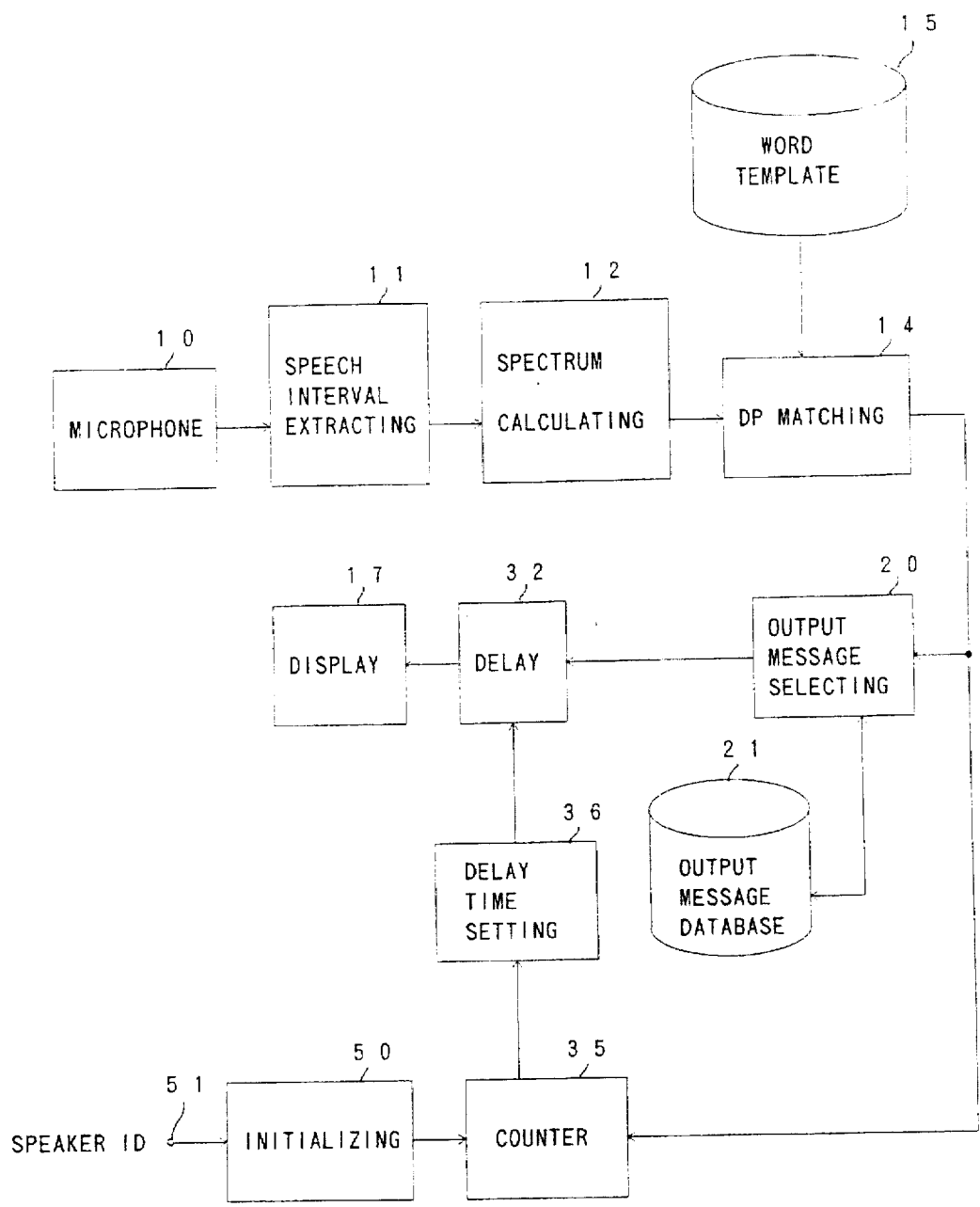
FIG. 10 is a system block diagram showing a seventh embodiment of the speech recognition apparatus according to the present invention.

FIG. 10 shows a seventh embodiment of the speech recognition apparatus according to the present invention. In FIG. 10, those parts which are the same as those corresponding parts in FIG. 5 are designated by the same reference numerals, and a description thereof will be omitted.

In FIG. 10, an initializing part 50 compares a speaker ID which is input via a terminal 51 and a previously input speaker ID, every time the speaker ID is input via the terminal 51. The initializing part 50 generates a reset signal only when the two compared speaker IDs differ. This reset signal is supplied to a counter part 35 to reset the counted value therein to zero. In other words, the number of times the apparatus is used is reset to zero every time the user change, and the response becomes faster thereafter as the number of times the apparatus is used increases.

Figure 11:
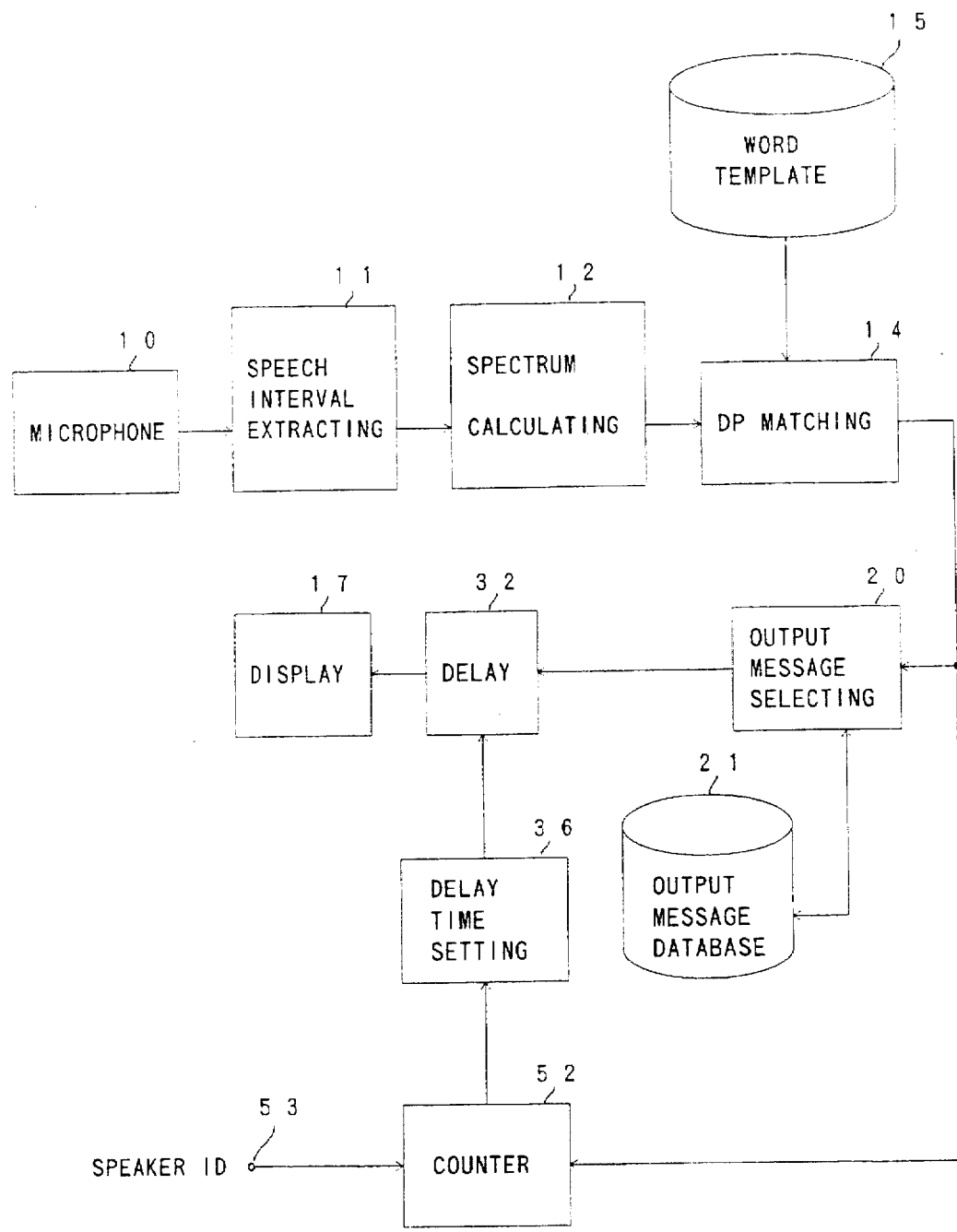
FIG. 11 is a system block diagram showing a modification of the seventh embodiment.

FIG. 11 shows a modification of the seventh embodiment. In FIG. 11, those parts which are the same as those corresponding parts in FIG. 5 are designated by the same reference numerals, and a description thereof will be omitted.

In FIG. 11, a counter part 52 independently counts the number of times the apparatus is used in correspondence with each speaker ID input via a terminal 53. The counter part 52 also supplies to the delay time setting part 36 the counted value which corresponds to the present user the speaker ID of whom is input via the terminal 53. Hence, the response becomes faster for each user as the number of times the apparatus is used increases.

Figure 12:
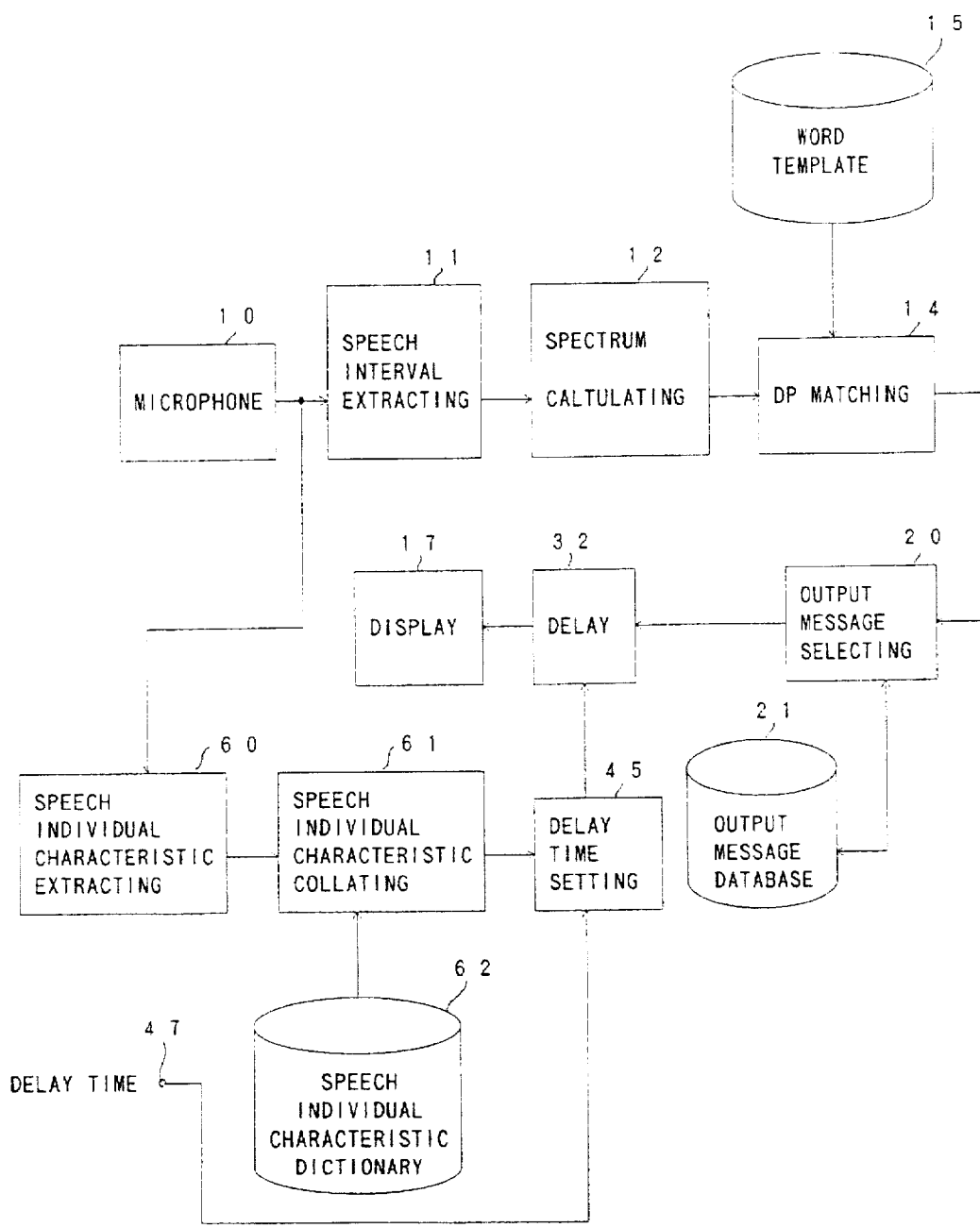
FIG. 12 is a system block diagram showing an eighth embodiment of the speech recognition apparatus according to the present invention.

FIG. 12 shows an eighth embodiment of the speech recognition apparatus according to the present invention. In FIG. 12, those parts which are the same as those corresponding parts in FIG. 9 are designated by the same reference numerals, and a description thereof will be omitted.

In FIG. 12, the output audio signal of the microphone 10 related to the input speech is supplied to a speech individual characteristic extracting part 60 which extracts parameters related to the individual characteristic of the speech such as the long-duration cepstrum. A speech individual characteristic collating part 61 collates the speech individual characteristic (parameters) extracted by the speech individual characteristic extracting part 60 and speech individual characteristics (parameters) which are registered in advance in a speech individual characteristic dictionary 62 together with each speaker ID. In other words, the speech individual characteristic collating part 61 carries out a matching between the extracted speech individual characteristic (parameters) and the registered speech individual characteristics (parameters), and supplies the speaker ID obtained by this matching to the delay time setting part 45. Hence, in this embodiment, the speaker ID is automatically obtained from the input speech.

Figure 13:
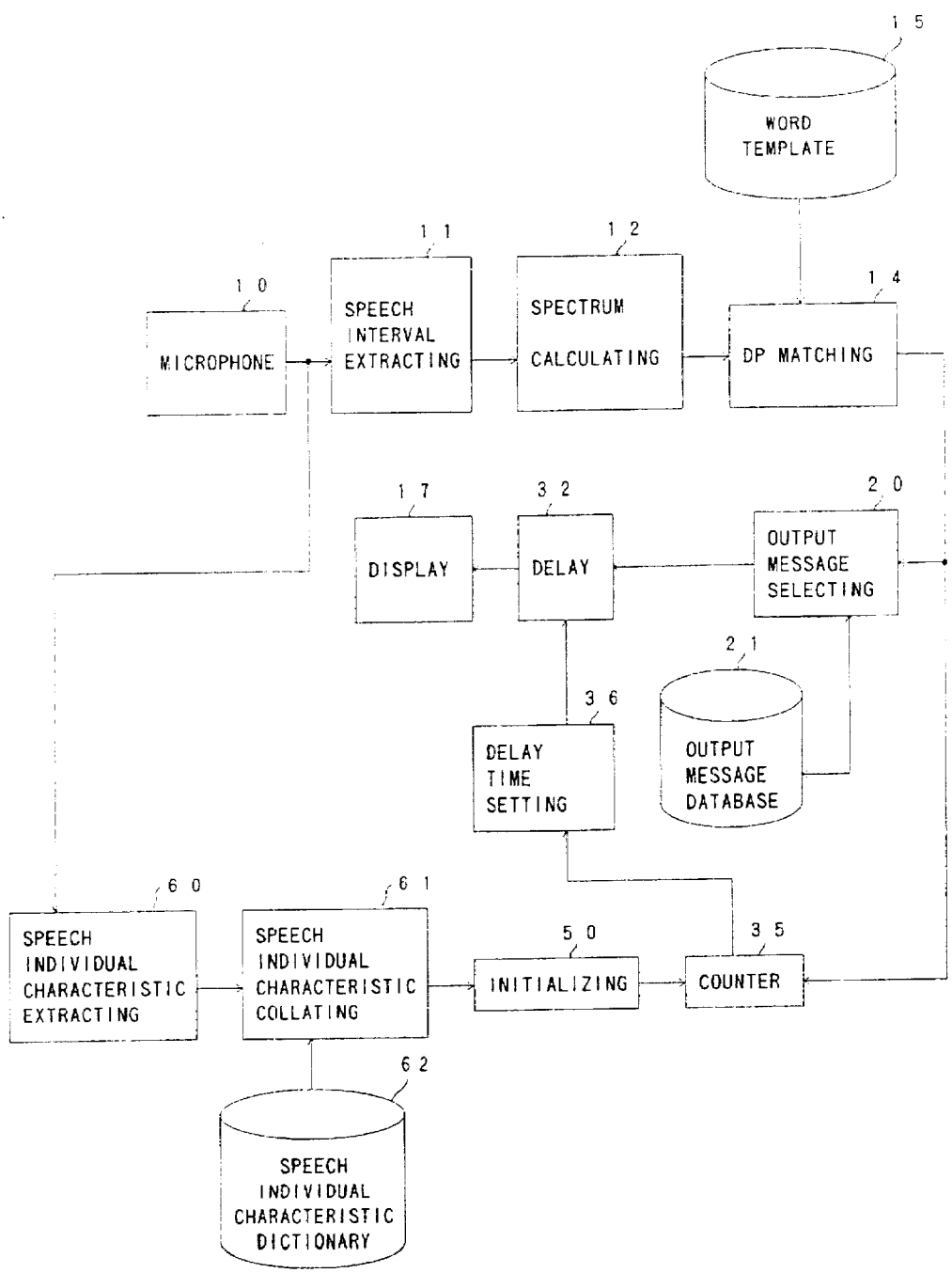
FIG. 13 is a system block diagram showing a first modification of the eighth embodiment.

FIG. 13 shows a first modification of the eighth embodiment. In FIG. 13, those parts which are the same as those corresponding parts in FIGS. 8 and 10 are designated by the same reference numerals, and a description thereof will be omitted.

In FIG. 13, the output audio signal of the microphone 10 related to the input speech is supplied to the speech individual characteristic extracting part 60 which extracts parameters related to the individual characteristic of the speech such as the long-duration cepstrum. The speech individual characteristic collating part 61 collates the speech individual characteristic (parameters) extracted by the speech individual characteristic extracting part 60 and speech individual characteristics (parameters) which are registered in advance in the speech individual characteristic dictionary 62 together with each speaker ID. In other words, the speech individual characteristic collating part 61 carries out a matching between the extracted speech individual characteristic (parameters) and the registered speech individual characteristics (parameters), and supplies the speaker ID obtained by this matching to the counter part 35. Hence, in this first modification of the eighth embodiment, the speaker ID is automatically obtained from the input speech.

Figure 14:
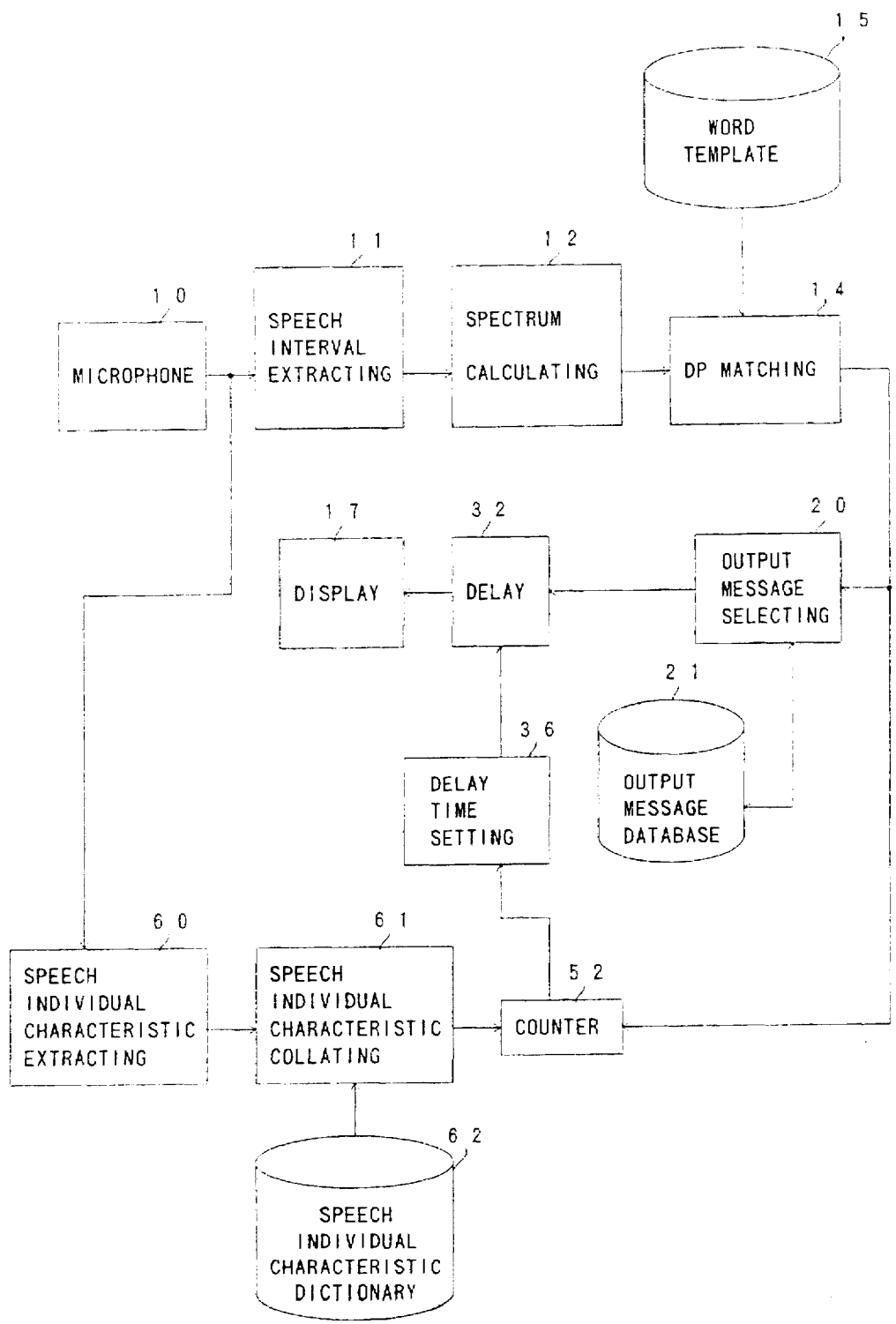
FIG. 14 is a system block diagram showing a second modification of the eighth embodiment.

FIG. 14 shows a second modification of the eighth embodiment. In FIG. 14, those parts which are the same as those corresponding parts in FIGS. 8 and 11 are designated by the same reference numerals, and a description thereof will be omitted.

In FIG. 14, the output audio signal of the microphone 10 related to the input speech is supplied to the speech individual characteristic extracting part 60 which extracts parameters related to the individual characteristic of the speech such as the long-duration cepstrum. The speech individual characteristic collating part 61 collates the speech individual characteristic (parameters) extracted by the speech individual characteristic extracting part 60 and speech individual characteristics (parameters) which are registered in advance in the speech individual characteristic dictionary 62 together with each speaker ID. In other words, the speech individual characteristic collating part 61 carries out a matching between the extracted speech individual characteristic (parameters) and the registered speech individual characteristics (parameters), and supplies the speaker ID obtained by this matching to the counter part 52. Hence, in this second modification of the eighth embodiment, the speaker ID is automatically obtained from the input speech.

In each of the described embodiments and modifications, it is of course possible to employ various known techniques for recognizing the input speech.

Further, the present invention is not limited to these embodiments, but various variations and modifications may be made without departing from the scope of the present invention.

What is claimed is:

1. A speech recognition apparatus which generates an output displayed on display means, said speech apparatus comprising:

recognition means for recognizing an input speech and for outputting a recognition result or a response corresponding to the recognition result;

delay means, coupled to said recognition means, for delaying the recognition result or the response output from said recognition means by a delay time;

display means, coupled to said delay means, for displaying the delayed recognition result or response output from said delay means; and delay time setting means for variably setting the delay time of said delay means, to delay the recognition result or the response output to the display means longer than a time defined by a user's confusion or comfort.

2. A speech recognition apparatus which generates an output that is displayed on display means, said speech recognition apparatus comprising:

recognition means for recognizing an input speech and for outputting a recognition result or a response corresponding to the recognition result;

delay means, coupled to said recognition means, for delaying the recognition result or the response output from said recognition means by a delay time and for supplying the delayed recognition result or response to the display means as the output of the speech recognition apparatus; and delay time setting means for variably setting the delay time of said delay means, to delay the recognition result or the response output to the display means longer than a time defined by a user's confusion or comfort.

3. The speech recognition apparatus as claimed in claim 1, wherein said delay time setting means receives the delay time input by a user and sets said delay time of said delay means.

4. The speech recognition apparatus as claimed in claim 1, which further comprises:

a clock measuring time-of-day, said delay time setting means being coupled to said clock and variably setting the delay time of said delay means depending on the time-of-day measured by said clock.

5. The speech recognition apparatus as claimed in claim 4, wherein said delay time setting means variably sets the delay time of said delay means depending on the time-of-day measured by said clock so that the delay time decreases with the time-of-day each morning.

6. The speech recognition apparatus as claimed in claim 4, wherein said delay time setting means variably sets the delay time of said delay means depending on the time-of-day measured by said clock so that the delay time is constant in each afternoon.

7. A speech recognition apparatus comprising:

recognition means for recognizing an input speech and for outputting a recognition result or a response corresponding to the recognition result; and delay means, coupled to said recognition means, for delaying the recognition result or the response output from the recognition means by a delay time; and delay time setting means for receiving the delay time and setting said delay time of said delay means, wherein said delay time setting means also receives a speaker identification which identifies a user who makes the input speech, and said delay time setting means sets a delay time which is input by each user in said delay means in correspondence with the received speaker identification.

8. A speech recognition apparatus comprising:

recognition means for recognizing an input speech and for outputting a recognition result or a response corresponding to the recognition result; and delay means, coupled to said recognition means, for delaying the recognition result or the response output from the recognition means by a delay time;

counter means for counting a number of times a speech recognition is made by the speech recognition apparatus; and delay time setting means, coupled to said counter means, for variably setting the delay time of said delay means depending on a counted value of said counter means.

9. The speech recognition apparatus as claimed in claim 8, which further comprises:

initializing means for resetting the counted value of said counter means when an input speaker identification identifying a user who makes the input speech differs from a previous input speaker identification.

10. The speech recognition apparatus as claimed in claim 9, which further comprises:

specifying means for analyzing the input speech and for specifying a speaker identification which identifies the user who makes the input speech.

11. The speech recognition apparatus as claimed in claim 8, wherein said counter means counts a number of times the speech recognition is made by the speech recognition apparatus for each speaker identification which is input, said speech identification identifying a user who makes the input speech.

12. The speech recognition apparatus as claimed in claim 11, which further comprises:

specifying means for analyzing the input speech and for specifying a speaker identification which identifies the user who makes the input speech.

13. A speech recognition apparatus which generates an output displayed on display means, said speech apparatus comprising:

recognition means for recognizing an input speech and for outputting a recognition result or a response corresponding to the recognition result;

delay means, coupled to said recognition means, for delaying the recognition result or the response output from said recognition means by a delay time;

speech interval calculating means for calculating a length of a speech interval of the input speech, said input speech being continuous during said speech interval; and delay time setting means, coupled to said speech interval calculating means, for variably setting the delay time of said delay means depending on the speech interval of said input speech calculated by said speech interval calculating means, to delay the recognition result or the response output to the display means longer than a time defined by a user's confusion or comfort.

14. A speech recognition apparatus which generates an output displayed on display means, said speech apparatus comprising:

recognition means for recognizing an input speech and for outputting a recognition result or a response corresponding to the recognition result;

delay means, coupled to said recognition means, for delaying the recognition result or the response by a delay time;

speech power calculating means for calculating a power of the input speech; and delay time setting means, coupled to said speech power calculating means, for variably setting the delay time of said delay means depending on the power of said input speech calculated by said speech power calculating means, to delay the recognition result or the response output to the display means longer than a time defined by a user's confusion or comfort.

* * * * *